July 15, 1941.  P. L. MEATH  2,249,249

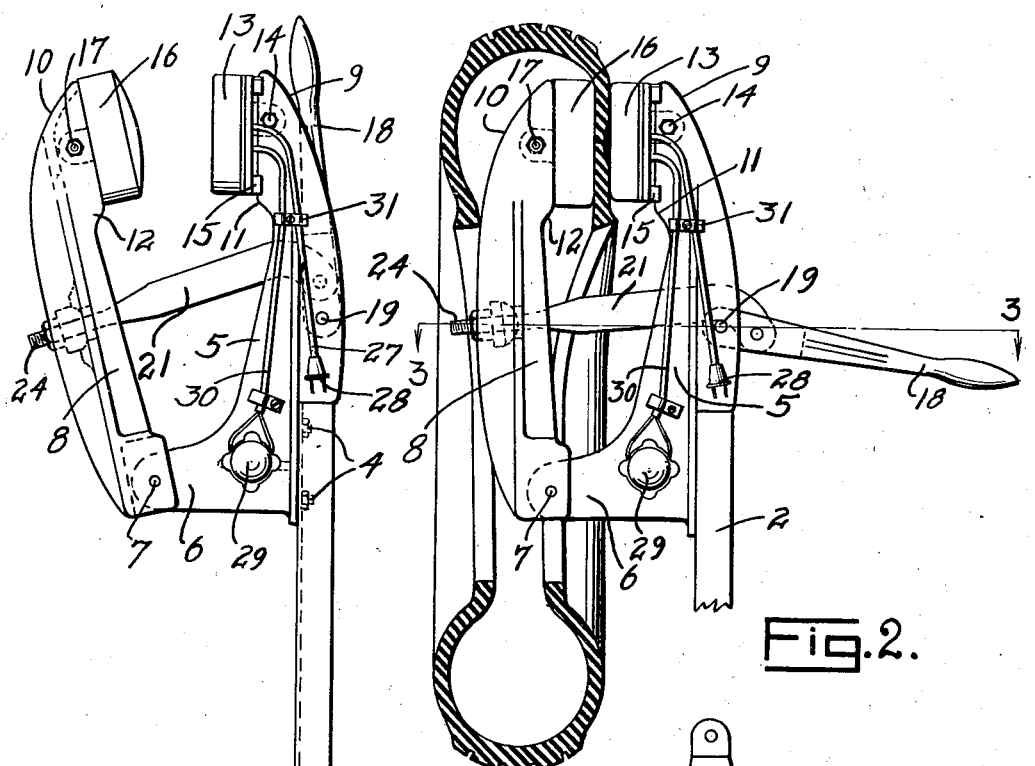
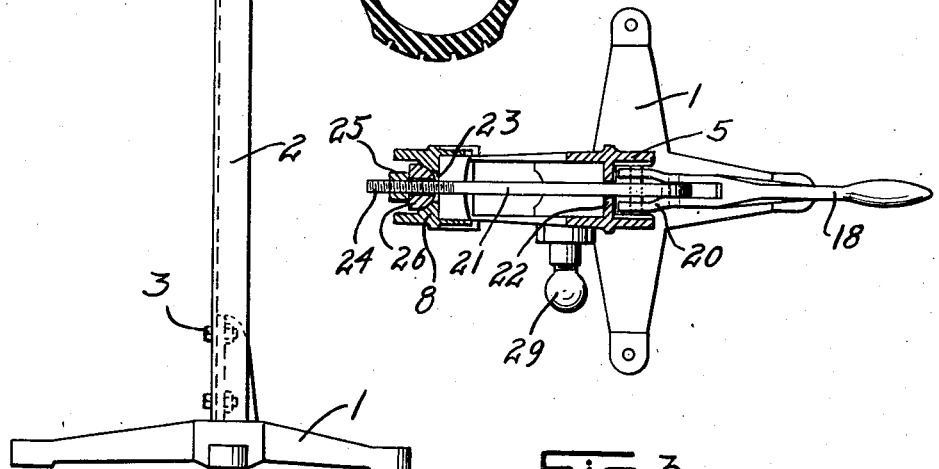
Fig. 1. Fig. 2. Fig. 3.
Inventor
Paul L. Meath.

APPARATUS FOR APPLYING HEAT TO ARTICLES TO BE REPAIRED

Filed Aug. 8, 1938  2 Sheets-Sheet 2

Inventor
Paul L. Meath.
By J. Vincent Martin and Ralph H. Browning
Attorneys.

Patented July 15, 1941

2,249,249

UNITED STATES PATENT OFFICE 2,249,249

APPARATUS FOR APPLYING HEAT TO ARTICLES TO BE REPAIRED

Paul L. Meath, Houston, Tex.

Application August 8, 1938, Serial No. 223,647

1 Claim. (Cl. 18—18)

This application is in part a continuation of my application, Serial No. 176,817 filed November 27, 1937.

This invention relates to improvements in apparatus for applying heat to articles to be repaired, and particularly to articles composed of rubber or rubber compound such as pneumatic tires or the like.

The general object of this invention is to provide an apparatus which is light and durable and which is highly efficient in repairing small breaks or weak spots in pneumatic tires or in other articles of rubber or rubber compound, or of materials the repair of which involves the application of heat.

In the usual practice of applying heat to rubber or rubber compound used in repairing tires, the tire is first placed in a mould which has an inner contour approximately the same as the outer contour of the tire. Pressure is then applied to the inside of the tire by inflating therein an inner tube or air bag with air, or by other various pressure devices for forcing the wall of the tire being repaired against the mould. Heat is then applied to the mould for the purpose of vulcanizing the rubber or rubber compound and repairing the tire.

In vulcanizing a break or weak spot in a tire or the like, however, it is advisable to confine the heat to the immediate vicinity of the place being repaired. The damaged spot, however, may be close to the bead or on the tread, as well as on any portion of the side wall. Likewise, it may be either external or internal, or both. With the tire repair devices now in use, it is necessary that a mould be had to fit or substantially fit each and every size or shape of tire which is to be repaired and it is necessary to heat the tire over a considerable area which may be spaced quite some distance from the spot being repaired. Inasmuch as this heat is always applied from the exterior of the tire, that is from the mould which surrounds the tire, if a repair is to be made on the inside wall of the tire, it is necessary that it be heated for a long period of time before the inside of the tire can attain the temperature sufficient to effect the repair. Furthermore, in such a device it is impossible to quickly place the tire in position and clamp it in position for the repair of be made, this operation requiring considerable time because the patching material must be properly positioned, the tire placed within the mound, the air bag or other pressure device placed within the tire, the tire secured in place and the air bag inflated.

It is therefore an object of this invention to provide a device of the type set forth which will be strong and rugged and a fast operating long life machine for the purpose of repairing relatively small portions of tires and tubes in a better, faster and cheaper manner than the methods and machines heretofore used.

Another object of this invention is to provide a device on which the tire or tube to be repaired can be placed with the greatest facility and accuracy and the repair effected with the least labor and loss of time.

It is a further object of this invention to provide such a device which will effect repairs by heating only that portion of the tire or other object which requires repair.

It is a further object of this invention to provide such a device which is capable of receiving a tire or similar structure in the greatest number of different positions so that repairs in all positions both inside and out may be effected with the greatest facility and so that the structure may be held by the device and clamped in place with greatest ease.

It is another object of this invention to provide such a device with a clamping pad which does not require inflation each time it is used, and which is not at any time when not in use under high pressure, yet which in use is capable of exerting the necessary pressure upon the work to be repaired.

In the previous structures also it has been impossible to easily and quickly place the tire or similar work to be repaired in the proper position and hold the same in position while clamping it in place. It is, therefore, another object of this invention to provide a device in which the tire or similar work will normally hang or be positioned in the proper position and can easily be held in the proper position while clamping.

Another object of this invention is to provide for the support of a device of the type set forth in such a manner that the functioning of the device will not be interfered with and the positioning of the work thereon will be facilitated.

Other objects and advantages of this invention will become apparent from the following description, taken in connection with the accompanying drawings, it being understood that said description and drawings set forth one embodiment by way of illustration only and the same is not to be taken by way of limitation.

In the drawings:

Fig. 1 is a side elevation of a device constructed in accordance with this invention illustrating the means of mounting the same, the device in this instance being shown in open or inactive position.

Fig. 2 is a view similar to the upper portion of Fig. 1, showing the tire clamped in position in the device for the purpose of effecting a repair on the outer side wall of the tire.

Fig. 3 is a horizontal cross section taken along the line of 3—3 of Fig. 2 and showing details of the clamping arrangement.

Figure 4:
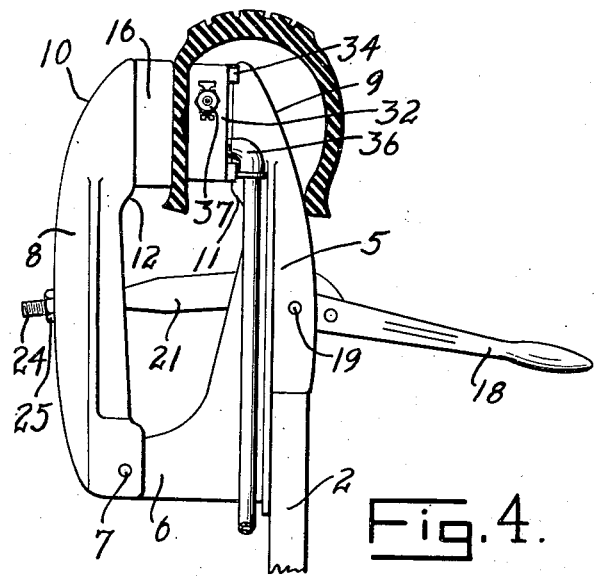
Fig. 4 is a view similar to Fig. 2 but illustrating a tire in position for effecting a repair on the inside wall of the tire.

Referring now in more detail to the drawings, the numeral 1 designates the base for the single bar pedestal 2 upon which the device constructed in accordance with this invention is mounted. The bar 2 is secured to the base 1 in any suitable manner such as by bolts 3 or the like and the upper end is secured by bolts 4 or similar holdfast connections to the upright stationary rigid arm 5 of the repairing machine. Adjacent its lower end, this rigid arm 5 is provided with a laterally extending part 6 to the outer end of which is pivoted at 7 the movable rigid arm 8.

Both the stationary and movable arms 5 and 8 are rounded off or tapered adjacent their outer upper ends as shown at 9 and 10 respectively, and both of these arms are also provided with a slightly inwardly overhanging part, as shown at 11 and 12 respectively. To the inwardly overhanging part 11 of the arm 5 is secured the heating member which in Fig. 1 consists of an electrical heater 13 secured to the arm 5 by means of a bolt 14 or the like and provided with lugs 15 which maintain it in proper relation with respect to the arm 5 and space it from the arm 5 to permit a circulation of air therebetween, thus preventing the transmission of heat to the arm 5.

Secured to the overhanging part 12 of the arm 8 is a pressure pad 16 secured to this arm by means of a bolt 17 or the like, this connecting means being preferably somewhat loose so as to permit the pad to rock slightly and accommodate itself to the work. The details of this pad will presently be discussed in connection with other figures of the drawings.

For the purpose of moving the arm 8 towards the arm 5 and clamping the two together with the work between the heating element 13 and the pad 16, there is provided a lever 18 pivoted at 19 intermediate the ends of the arm 5 and overlying the slotted portion of said arm as shown in Fig. 3. As shown also in Fig. 3 this lever is bifurcated at 20 and at a point spaced somewhat from the pivot 19 there is pivotally connected to the lever 18 a link 21. This link extends through the slot 22 of the arm 5 and through an opening 23 in the arm 8. On its end which extends through the opening 23, this link 21 is threaded as at 24 to receive a nut 25 which in turn holds a washer 26 against movement off of the end of the link. This washer 26 is preferably provided with a spherical surface co-acting with a corresponding surface formed about the opening in the arm 8 so that the link 21 may swing freely with respect to the arm 8 without bending.

Figure 6:
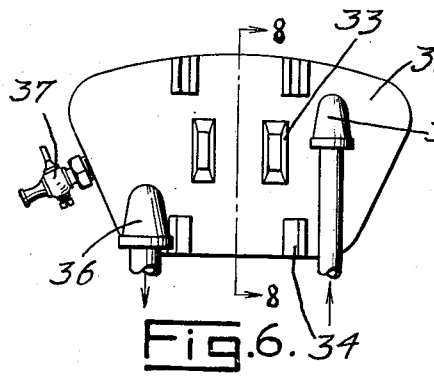
Fig. 6 is a rear view of a heating unit for use with the device set forth, the heating unit in this case being adapted to use steam as the heating medium.

Referring now more particularly to the heating unit, that shown in Figs. 1 and 2 is simply an electrical heater of any well known type and of a shape corresponding to the shape of the modified heater shown in Fig. 6. This heater is supplied with current through a cord 27 having a plug 28 thereon for use with any standard outlet. A tell-tale lamp 29 is supplied by an electrical cord 30 mounted preferably on the lower end of the rigid stationary arm 5. Both the cord 27 and the cord 30 are preferably fastened to and follow along down the rigid stationary arm 5 by means of a clamping device 31.

In certain instances, however, it may be found desirable instead of using electricity for heating purposes to employ a pad heated by steam or the like as shown in Figs. 4 to 8, inclusive. In this type of device, the heater simply consists of a steam box 32 of the shape shown in Fig. 6 having on its rear surface lugs 33 by which it is bolted to the arm 5 and lugs 34 which taken with the lugs 33 serve to space the heater from the arm 5. These heating elements are made preferably interchangeable with those shown in Figs. 1 and 2 so that whichever form of heat is most readily available can be employed with any machine by simply changing the heating device.

The steam box 32 is also provided on its rear surface with an input conduit 35 and an exhaust conduit 36. For the purpose of releasing any air from the steam box when the device is first put in operation, there is provided a petcock, 37.

Figure 7:
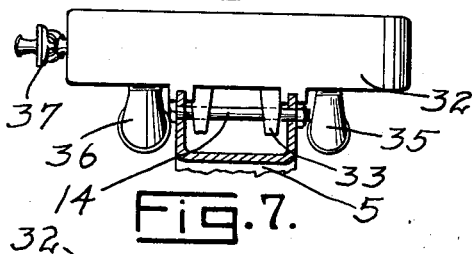
Fig. 7 is a top plan view of the structure illustrated in Fig. 6.
Figure 8:
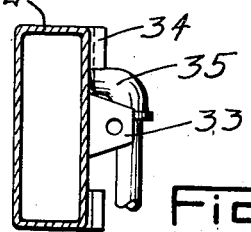
Fig. 8 is a vertical cross section taken along the line 8—8 of Fig. 6.

It is particularly noted that in connection with the steam heating device illustrated in Figs. 4 to 8, inclusive, the supply and exhaust pipes leading from the openings 35 and 36 respectively extend down along the rigid stationary arm of the device and lie close to this arm as illustrated in Fig. 7.

Figure 9:
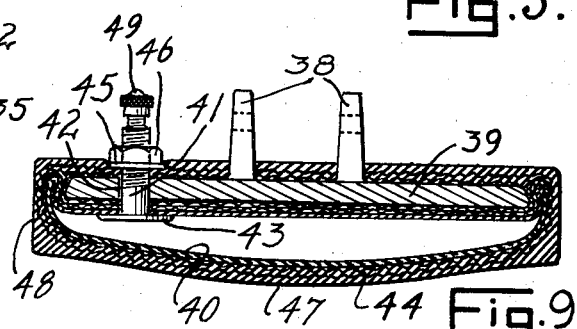
Fig. 9 is a horizontal cross section of the pressure applying pneumatic pad forming a part of this device and for use in applying the pressure to force the work against the heating unit.
Figure 10:
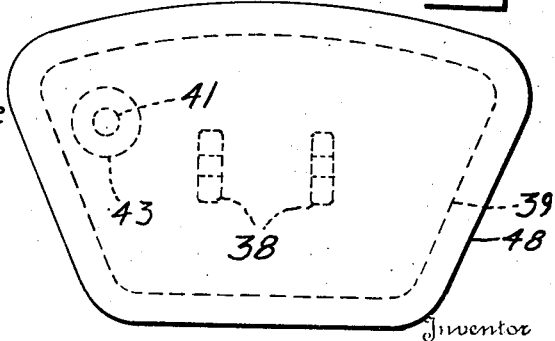
Fig. 10 is a front elevation of the structure shown in Fig. 9.

Referring now to the pad or pressure applying element 16, the details of this element are illustrated in Figs. 9 and 10. It will be seen that this element is provided with lugs 38 by which it is bolted to the rigid movable arm 8, and that these lugs 38 are secured to a rigid plate support member 39. In the manufacture of this particular element, a closed sac is first formed by winding the fabric and rubber layers 40 in the usual manner. The valve stem 41 is then placed in this sac and the sac is placed against the plate 39 with the stem 41 extending through an opening 42 in the plate 39. This stem 41 has the usual clamping flange 43 for clamping against the inner wall of the sac.

With the sac just described in the position shown in Fig. 9, there is then wound about both the sac and the plate 39 still other layers of fabric and rubber as illustrated at 44. A washer 45 and a nut 46 are then screwed onto the valve stem 41 to clamp the same firmly in position. The sac and the entire pad is so made that the pad will bulge to a considerable extent adjacent the central part of its working face as shown at 47. The edges or side walls 48 of the pad are left free so that they may move either inwardly or outwardly depending upon the influences acting upon the pad. This pad is preferably of the same outline and substantially the same size as the heating element.

Referring now to the operation of the device, the pressure pad referred to is first inflated through the valve stem 41 within which any suitable valve may be mounted, until the pad contains a pressure of 12 to 15 pounds per square inch. The valve stem is then closed by placing the valve stem cap 49 in position. After this first inflation no further inflation or deflation of the pad is necessary. This feature involves a considerable saving in time because the act of deflating and inflating each time a repair is to be made consumes quite a large amount of time concerned with the total time required.

The inflated pad assumes substantially the shape shown in Fig. 9.

Let it be assumed first that a repair is to be made on the exterior of the side wall of a tire as shown in Fig. 2. For making such a repair, it is desirable that the surface to be repaired be placed next to the heating device so that the repair can be effected as quickly as possible without heating the remainder of the tire any more than is necessary. The operator will first place the repair materials in position in a manner well known. He will then lift the tire and place it over the rigid moveable arm 8 with the pressure applying pad 16 inside the tire and with the side wall to be repaired between this pad 16 and the heater 13. With the tire thus hanging of its own weight in substantially the proper position, the handle on the lever 18 is pulled downwardly. As shown, the link 21, is bent adjacent its pivot and so that its pivoted point may move downwardly past the line of centers between the pivot 19 and the center of the washer 26. The handle 18 may be moved downwardly until this occurs, whereupon the two arms will be held together in proper clamped position.

The degree of clamping of the two arms together will only depend upon the adjustment of the nut 25 and this adjustment may be varied to suit the mechanism of the tire or other object being repaired. With the nut 25 properly adjusted, upon movement of the handle toward clamping position as just described, the bulged central portion 47 of the pad will be forced inwardly with the side wall 48 spreading outwardly a slight amount. This action causes a great decrease in the volume of the space within the pad and hence results in a tremendous increase in the pressure of the air within the pad. Thus, whereas the pressure of this air when the pad is originally inflated is between 12 and 15 pounds per square inch, after this clamping has taken place, the pressure within the pad is preferably between 50 and 75 pounds per square inch. Thus, the very clamping action itself produces the pressure necessary within the pad without necessity for inflating the pad or for deflating it after use.

By virtue of the fact that the pad except when in actual use contains a very low pressure of air, there is little tendency for the pad to leak. Further, as above described, the pad consists of a complete sac, this complete sac is bound to the supporting plate 39 with another complete sac formed by winding fabric and rubber around both the first sac and the plate. Thus, there is formed in effect two complete containers, one within the other, and with the two vulcanized together except where the plate 38 is positioned therebetween. At the same time, this plate 39 forms a uniform support for the pad throughout its rear surface enabling it to apply a substantially uniform pressure to the work over the entire surface of the pad. However, this rigid support does not interfere with the flexing of the side wall 48 or the working face 47 of the pad and the pad is enabled to flex in such manner as may be required in order to adapt itself to the work.

It has been mentioned that the support for the device here described consists of a single bar 2. This bar 2 is mounted on a base 1 which in turn rests upon the floor. This at first blush may not seem important but as a matter of actual practice it is of great importance in making possible a swift and easy operation of the device. If the device for example were mounted on a bench, it would either not be high enough to permit a tire to be placed over it in the manner shown in Fig. 2 or it would be so high that it would be difficult if not impossible for an operator to reach it. By placing the device on the floor and mounting it on a single bar pedestal, the device may be mounted at such a height that a tire can be easily accommodated and the device will not be out of reach of the operator. Furthermore, the use of the single bar pedestal makes possible the support of the device in such a manner that a tire may be mounted over either arm of the device without interference from the pedestal, as will be presently set forth.

With the tire clamped in place, as shown in Fig. 2, heat is applied to the heating element until the vulcanizing of the repair is complete after which the tire may be removed by simply raising the lever 18 to its vertical position and lifting the tire off. If during the course of vulcanization, it is desired that the operator inspect the work, this may readily be done by simply loosening up the clamping lever until the work may be inspected. If the vulcanization is complete, the work will separate readily from the heater, but if the vulcanization is incomplete, the work will stick to the heater so that the operator can tell easily whether the work has reached the stage of completion and if this stage has not been completed when he examines the work, all he needs to do is to push the lever down to its clamping position and wait until the process is completed. Thus, it is possible for the operator to inspect the work without disturbing its progress.

It is to be noted that the beveling of the arm at 10 facilitates the placing of the tire over this arm and makes for the least interference with the proper positioning of the tire in the device.

It will further be appreciated that by virtue of the compression of the pad during the clamping of the work in place, the necessity for a resilient connection somewhere in the clamping mechanism is eliminated. If it were not for this compression of the pad and its resiliency, it would be necessary either to provide a resilient arm 8, or a resilient member in the form of a spring or the like in conjunction with the link 21. The use of the pad in the manner described renders this unnecessary.

Referring again to the operation of the device and this time assuming that a repair is to be made on the inside of the side wall of a tire, reference is had to Fig. 4. In this case, it will be seen that the tire is placed over the rigid stationary arm 5 and the heating element, which in Fig. 4 is designated by the numeral 32. The operation is substantially the same as in the example just given where the repair is made on the exterior surface of the tire. The tire is simply lifted, placed over the desired portion of the device and then clamped in place by moving the lever 18 downwardly. It is particularly to be noted that in the case where the tire is to be placed over the heating unit, this is made possible in the form shown in Fig. 2 by virtue of the fact that the electrical connections 27 and 30 are secured to and extend down along the rigid stationary arm 5. Thus, they do not in any way interfere with the placing of a tire over this arm. On the other hand, in Fig. 4, the supply and discharge pipes 35 and 36 extend downwardly along the respective sides of the rigid stationary arm 5 so that they do not interfere with the proper positioning of the tire.

Figure 5:
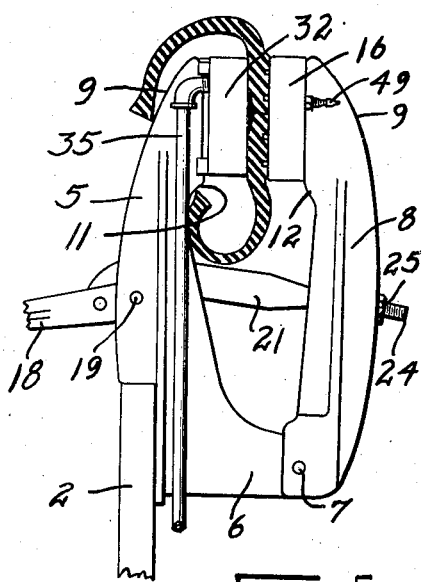
Fig. 5 is a view similar to Figs. 2 and 4 but showing the device in a reverse position and illustrating the repair of the tread portion of a tire.

With reference to Fig. 5, there is illustrated here the manner of effecting a repair on the inside surface of a tire opposite the tread thereof. This is made possible either on the exterior or the interior of the tread portion of the tire by virtue of the overhanging portion of the upper ends of the rigid arms and of the pressure applying pad and heating unit. This overhanging serves to accommodate the side wall of the tire which must of necessity lie between the clamping arms during this operation.

From the foregoing it will be seen that an extremely simple machine, as well as a strong durable and cheaply manufactured machine has been provided which is capable of quickly and easily effecting small repairs in pneumatic tires or the like.

It will be appreciated that with this device, an operator can inspect the work being done without disturbing its progress or success, that he can place the work in the machine with the least effort because of the fact that its jaws open upwardly and that he can clamp it into place with greatest facility, because of the simplicity of the clamping arrangement. It will be appreciated that much time will be saved because of the lack of any necessity for inflation or deflation of the pressure applying member and because of the rapidity with which the work may be placed in and removed from the machine.

It will further be appreciated that economies will be effected by virtue of the small amount of heat necessary, because the heat is applied only locally to the part being repaired and is applied directly to that part without necessity for it to be transmitted through the thickness of the work.

It will further be apparent that by virtue of the construction of the device with the overhanging parts on the clamping arms, it is possible to effect repairs by applying the heat directly to the part to be repaired whether that part be inside or outside of the tire or whether it be on the side wall adjacent the bead or on the tread.

Furthermore, a mounting has been provided which will adequately support the device in the most convenient position without in any way interfering with the placing of the work in such manner as to most efficiently effect its repair. The supply of heat to the heating device is also arranged in such a manner that it will not interfere with the placement of the work.

The construction of the pressure applying member is such that although it is the proper shape to most effectively contact the work, and one side and the surrounding edges are left free to flex so that they might most efficiently perform their function, yet the pad is supported throughout its entire area so as to apply pressure most uniformly to the work.

The pad, in addition to the foregoing, is of small capacity, and is adapted to be inflated to only a low pressure, thus eliminating practically all problems of inflation without dispensing with the advantages to be gained from the use of a high pressure pad. The matter of constructing the pad is also such as to render it most durable and least likely to show leaks or other defects during its operation.

It will be appreciated that numerous changes may be made in the details of construction and arrangement of parts set forth in the foregoing illustration without departing from the spirit or scope of this invention, and it is, therefore, to be understood that this invention is to be limited in its scope only by the prior art and by the terms of the appended claim.

Having described my invention, I claim:

In a device for repairing pneumatic tire casings and the like, a clamping means comprising a pair of upstanding arms pivotally connected to each other adjacent their lower ends, a heating member on one of said arms substantially at the upper end thereof and having a clamping surface facing toward the other arm, a clamping member on the other of said arms substantially at the upper end thereof and having a relatively flexible clamping surface directly opposed to said first clamping surface, said arms extending directly downwardly from said clamping and heating members a sufficient distance to clear the side wall of a casing hung over said heating member or said clamping member, a quick acting latching means permanently connecting said arms a distance below said clamping members sufficient to clear the side wall of a casing so disposed, means lying closely adjacent and along the upper end portion of the arm carrying said heating member for supplying energy to said heating member, and supporting means connected with said clamping means for supporting and maintaining said clamping means in upright position and so positioned in relation to said heating and clamping members as to clear a casing so disposed, whereby a casing may be hung over either of said members with its general contour substantially undisturbed and with one side wall between said members and with either its inner or outer surface against said heating member.

PAUL L. MEATH.